United States Patent Office 3,316,186
Patented Apr. 25, 1967

3,316,186
SOLUBLE DIPHENYL ETHER POLYMERS
Gerald R. Geyer, Melvin J. Hatch, and Hugh B. Smith, Midland, Mich., assignors to The Dow Chemical Company, Midland, Mich., a corporation of Delaware
No Drawing. Filed July 31, 1963, Ser. No. 299,073
24 Claims. (Cl. 260—2.1)

This invention relates to new soluble polymers containing a plurality of diphenyl ether moieties. More particularly, it relates to soluble polymers wherein the polymer matrix comprises in major proportion a plurality of diphenyl ether moieties linked with methylene bridges. Still more particularly, it relates to soluble diphenyl ether homopolymers and derivatives thereof, and to a process for their synthesis.

In recent years the tremendous scope of utility for soluble polymers has led to a vigorous search for new materials. Particularly desirable are water-soluble polymers. For example, water-soluble synthetic polymers have been developed for such diverse applications as adhesives, detergents, drilling mud additives, flocculants, thickeners for food products, etc. The characteristics of these polymers including solubility are clearly related to their structure as well as to their composition. Soluble polymers must be free of extensive cross-linking between adjacent polymer chains since such bonding rapidly destroys solubility.

For some time it has been kown that chloromethyldiphenyl ether and other similar reactive diphenyl ether derivatives readily undergo condensation polymerization to an insoluble cross-linked resinous product. As described by Doedens in United States Patent 2,911,380, this polymerization involves condensation between a reactive halomethyl group of a halomethyldiphenyl ether molecule with a second diphenyl ether moiety to form a methylene bridge with concurrent elimination of hydrogen halide. The basic reaction in this condensation is illustrated in Equation 1 wherein X is chlorine or bromine.

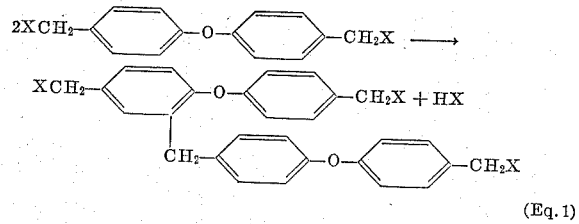

(Eq. 1)

It is evident that cross-linking as well as further polymerization can occur through continued reaction of the residual halomethyl groups with other diphenyl ether moieties. Since the reaction to form cross-linking methylene bridges is the same as that involved in polymer chain extension, the final condensation polymer is in practice nearly always a highly cross-linked resinous polymer insoluble in most polar and non-polar solvents. Only when there has been a deficiency of halomethyl groups or reactive sites have soluble polymeric materials been obtained.

Because of the thermal stability of the diphenyl ether moiety and the possibilities of introducing various functional groups through chemical reaction with residual reactive groups, a soluble condensation polymer containing a plurality of diphenyl ether moieties is highly desirable. Particularly advantageous would be a soluble diphenyl ether homopolymer containing residual halomethyl groups.

It has now been discovered that soluble diphenyl ether polymer containing a plurality of diphenyl ether moieties linked with methylene bridges can be obtained by condensation polymerization of a reactive aromatic material which contains:

(1) A major proportion by weight of a diphenyl ether of the general formula:

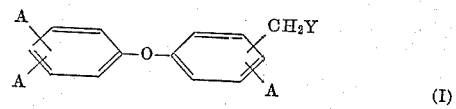

(I)

wherein each A is independently selected from the group consisting of hydrogen and —$CH_2Y$ wherein Y is Cl, Br, OH or OR, R being a $C_1$–$C_4$ alkyl group, and (2) An average of from about 1.0 to 3.5 —$CH_2Y$ groups per molecule;

said polymerization being achieved in the presence of a suitable, non-reactive diluent and a Friedel-Crafts catalyst at a temperature in the range from about 0° to 85° C. The resulting soluble diphenyl ether condensation polymer comprises in major proportion a plurality of moieties of the general formula:

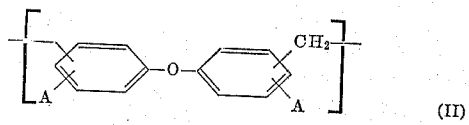

(II)

wherein each A is defined as above. It is a stable white solid material which readily dissolves in many non-polar organic solvents such as methylene chloride, 1,2-dichloroethane, benzene, toluene, dioxane, etc.

It has been further discovered that the soluble diphenyl ether polymers prepared by condensation in the presence of a suitable diluent can be employed as intermediates in the synthesis of new and valuable soluble cationic polymers. For example, by reaction of residual halomethyl groups in the soluble polymer with a suitable tertiary amine or organic sulfide, quaternary ammonium or sulfonium groups can be chemically bonded to the polymeric matrix. By addition of a suitable number of hydrophilic cationic substituents, generally at least 0.3 cationic groups per diphenyl ether moiety, highly valuable water-soluble products are obtained.

These cationic polymers and particularly the quaternary ammonium and sulfonium derivatives have properties which make them extremely useful for a variety of applications. Thus, for example, water-insoluble products are particularly useful in a solvent extraction process for the removal of anions from aqueous solution. Water-soluble products are suitable as flocculants, thickeners and binders. Because the diphenyl ether polymer matrix is extremely resistant to thermal and oxidative attack, these materials have exceptional chemical and thermal stability. Furthermore, because of such factors as relatively inexpensive raw materials, the stability of the soluble intermediate polymers, and the ease with which desired substituents can be bonded to the polymer matrix, important and significant process advantages and economies are inherent in the production of these materials.

DEFINITIONS

As used above and throughout the specification and claims, the term "soluble" means dispersible in a liquid solvent to provide a visually homogeneous and substantially transparent solution infinitely dilutable with the same solvent. In the characterization of polymer solubilities, methylene chloride, 1,2-dichloroethane, toluene and heptane are used as typical non-polar organic solvents while water and aqueous alcohol are representative polar solvents. Also in line with common practice, the term "halomethyl" as used herein includes both chloromethyl and bromethyl groups.

DIPHENYL ETHER CONDENSATION POLYMERS

As described by Doedens in United States Patent 2,911,380, chloromethyldiphenyl ethers and other similar reactive diphenyl ether derivatives readily undergo condensation polymerization to an insoluble, cross-linked resinous product often in the form of a brittle resinous foam. At a temperature greater than about 120° C., the polymerization can be initiated thermally. However, in the presence of a Lewis acid catalyst such as aluminum chloride, zinc chloride, ferric chloride, or ferric phosphate, it occurs readily at a temperature greater than about 90° C.

As further described by Doedens, the reactant mixture for this condensation polymerization may contain in addition to a halomethyldiphenyl ether, minor amounts of up to 10 to 20 weight percent of other reactive, non-halomethyl aromatic materials as modifiers. Examples of such modifiers are diphenyl ether, di(p-tolyl)ether and other similar aromatic ethers; phenolic compounds having at least one active aromatic ring position; and aromatic polymers, such as polystyrene, which have a reactive aromatic nucleus. At least a portion of such reactive, non-halomethyl modifiers becomes chemically bonded within the resinous diphenyl ether polymer.

To understand the invention described herein, diphenyl ether must be recognized as a reactive aromatic compound which undergoes electrophilic substitution reactions preferentially at the positions ortho and para to the ether oxygen. In practice only 4 positions are generally available because once one of the ortho positions of each ring becomes substituted, reaction at the other ortho positions is severely hindered sterically. Thus, for example, Doedens and Rosenbrock disclose in United States Patent 3,047,518 that chloromethylation of diphenyl ether gives a mixture of chloromethyldiphenyl ethers containing from 1 to 4 chloromethyl groups per diphenyl ether moiety. The exact composition depends upon reaction conditions and particularly on the proportion of chlormethylating agent employed. Several typical chloromethyldiphenyl ether (CMDPE) compositions are given in Table 1.

TABLE 1.—TYPICAL CHLOROMETHYLDIPHENYL ETHER COMPOSITIONS

|  | CMDPE | | | |
| --- | --- | --- | --- | --- |
|  | 17 | 25 | 32 | 33 |
| Wt. percent Cl | | | | |
|  | 17.6 | 25.2 | 32.0 | 33.6 |
| Mole Ratio: ClCH$_2$-/DPE | | | | |
|  | 1.12 | 1.85 | 2.80 | 3.0 |
| Composition (mole percent): | | | | |
| Diphenyl Ether (DPE) | 17.3 | 0 | 0 | 0 |
| 2-chloromethyl DPE | 5.3 | 0.3 | 0 | 0 |
| 4-chloromethyl DPE | 42.9 | 2.4 | 0 | 0 |
| 2,4'-bis(chloromethyl) DPE | 10.8 | 17.7 | 1.9 | 1 |
| 4,4'-bis(chloromethyl) DPE | 20.6 | 68.5 | 8.6 | 16.5 |
| Tris(chloromethyl) DPE | 2.3 | 10.5 | [1]89 | 66.5 |
| Tetrakis(chloromethyl) DPE | <1 | <1 | <2 | 16.5 |

[1] 17% 2,2',4- and 72% 2,4,4'-tris(chloromethyl) DPE.

The doedens process for the polymerization of halomethyldiphenyl ether is broadly applicable to the preparation of insoluble resinous polymers with an average of from about 1.1 to 1.2 halomethyl groups being consumed in the polymerization. Because the same reaction is involved in both chain extension and cross-linking it has not been possible to obtain soluble products except by blocking reactive sites with other substituent groups as in the polymerization of the chloormethylated ditolyl ethers. Thus, it has not been possible by the Doedens process to obtain a soluble diphenyl ether condensation polymer and particularly such a soluble polymer having an appreciable residual halomethyl content.

SOLUBLE DIPHENYL ETHER CONDENSATION POLYMERS

It has now been discovered that soluble diphenyl ether condensation polymers can be obtained by mixing a solution or fine dispersion of a reactive aromatic material comprising in major proportion by weight a diphenyl ether of the general Formula:

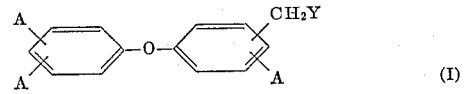

(I)

wherein each A independently is selected from the group consisting of hydrogen and —CH$_2$Y wherein Y is Cl, Br, OH, or OR R being a C$_1$–C$_4$ alkyl group, and having an average of from about 1.0 to 3.5 —CH$_2$Y groups per molecule, and a Friedel-Crafts catalyst in a suitable liquid diluent at a temperature between 0° and 85° C. for a time sufficient to achieve the desired polymerization. The resulting polymer, as indicated by its solubility in such non-polar organic solvents as 1,2-dichloroethane and toluene at concentrations of from 1 to 10 weight percent or more, is free of any substantial cross-linking and is composed essentially of linear and lightly branched polymer chains. It is a light colored, stable solid which is easily isolated from the reaction mixture by precipitation with a polar diluent such as methanol, by evaporation of the diluent, or other conventional means. When purified by reprecipitation from an appropriate solvent mixture such as dioxane and methanol, it is essentially colorless. A 10 weight percent solution of polymer in 1,2-dichloroethane has an Ostwald viscosity of from about 1.3 to 25 centipoises (cps.) at 25° C.

As the reactive aromatic material in the modified condensation polymerization process described herein, it is often particularly advantageous to use a crude mixture of halomethyldiphenyl ethers having an average of from about 1.0 to 3.5 halomethyl groups per diphenyl ether moiety such as the crude chloromethylation products shown in Table 1. Yet pure mono-, bis-, or tris-halomethyldiphenyl ethers can also be used. Furthermore, minor amounts of up to 10 or 20 weight percent of other reactive, non-halomethyl aromatic materials such as diphenyl ether or a soluable polystyrene can be included in the reaction mixture provided there is an average of at least about 1.0 halomethyl groups per molecule of reactive aromatic material. At least a portion of such other reactive material becomes chemically bonded in the polymer matrix.

In polymerizing a variety of chloromethyldiphenyl ethers such as the crude mixtures shown in Table 1 using the polymerization process described herein, it has been found that an average of about 1.0 chloromethyl groups per diphenyl ether moiety is consumed in the condensation reaction. Thus, for example, a crude chloromethyldiphenyl ether containing 31.5 wt. percent side chain chlorine, an average of 2.65 chloromethyl groups per diphenyl ether moiety, was polymerized in 1,2-dichloroethane to give a soluble polymer containing 22.1 wt. percent residual chlorine and an average of about 1.60 chloromethyl groups per diphenyl ether moiety. Similar results are obtained with other diphenyl ether monomers. Indeed, theoretically only one halomethyl group should be consumed per monomer unit in the formation of a high molecular weight linear condensation product.

An initial halomethyl content greater than about 3.5 is generally undesirable particularly in a homopolymerization because there must also be reactive sites on the aromatic nuclei for the formation of the necessary methylene bridges. More highly halomethylated diphenyl ethers can be used in mixtures with other reactive, non-halomethyl aromatic materials provided the average halomethyl content of the monomer mixture is in the range from about 1.0 to 3.5 halomethyl groups per molecule.

Halomethyl groups present in excess of the number consumed by polymerization are retained as substituents on the polymer matrix and provide means for further chemical reaction. The number of residual halomethyl groups depends, of course, on the initial halomethyl content of the monomer. From the homopolymerization of chloromethyldiphenyl ether, soluble products have been obtained containing from as little as 1 to 25 or more weight percent side chain chlorine or an average of from about 0.5 to 2.0 or more residual chloromethyl groups per diphenyl ether moiety. Thus, by appropriate choice of the initial monomer it is possible to obtain soluble dihenyl ether polymers of a widely varied composition.

Although halomethylation of diphenyl ether as described by Doedens and Rosenbrock in United States Patent 3,047,518 is a preferred method for obtaining reactive diphenyl ether monomers for use in the process described herein, side chain chlorination or bromination of a suitable alkyl-substituted diphenyl ether such as ditolyl ether is an alternative route for the synthesis of the monomers. Still other diphenyl ether monomers which can be polymerized in solution to give the desired polymer matrix of diphenyl ether groups linked with methylene bridges will be evident to those skilled in the art. For example, solution polymerization of an alkoxymethyl- or hydroxymethyldiphenyl ether having an average of about 1.0 or more alkoxymethyl or hydroxymethyl groups per molecule provides a similar soluble diphenyl ether condensation polymer.

Particularly critical in this solution or suspension polymerization process is the nature of the liquid used as a solvent or diluent. Obviously such a liquid should be substantially inert under the usual polymerization conditions. Also, for ease of operation including the recovery of the polymer and diluent, a liquid having a normal boiling point in the range from about 30° to 150° C. is preferred.

It has been found that $C_1$-$C_4$ halogenated aliphatic hydrocarbons, such as carbon tetrachloride, methylene chloride, ethylene dichloride, ethylene trichloride, bromochloroethane, methylene dibromide and propylene dichloride are particularly effective in providing a homogeneous polymerization mixture. These solvents are generally preferred. Liquid, saturated aliphatic hydrocarbons such as heptane and cyclohexane are also suitable if used with vigorous agitation to provide a fine dispersion or suspension of reactants. Halogenated aromatic liquids such as chloro- or o-dichlorobenzene can be used. Although aromatic hydrocarbons such as toluene, benzene, or xylene are good solvents for the reactants, some, particularly toluene, are sufficiently reactive as monomers to participate in the polymerization reaction, thus reducing both the residual halomethyl content and the chain length of the polymeric product. Oxygen containing solvents such as dioxane, acetone, alcohols, and glycol ethers, are unsatisfactory since they prevent polymerization presumably by inactivating the catalyst.

Typical of the Friedel-Crafts catalysts which have been employed in this solution or dispersion polymerization process are aluminum chloride, stannic chloride, stannous chloride, zinc chloride, ferric chloride, and sulfuric acid. In general, the milder catalysts and particularly zinc chloride and stannic chloride are preferred as they are more selective in promotion of the desired linear polymerization without cross-linking through the residual halomethyl groups. Although an effective catalyst, aluminum chloride is less soluble in the preferred chlorinated aliphatic hydrocarbon diluents. Since a tendency for the polymer to cross-link on the surface of the undissolved catalyst particles has been observed, catalysts which are completely soluble at the desired concentration are advantageous.

In general a catalyst concentration in the range from about 0.1 to 1.0 wt. percent or more based on the reactive aromatic monomer content is satisfactory.

In practice of the process described herein, a homogeneous polymerization system is preferred with a halogenated aliphatic hydrocarbon as solvent and zinc chloride or stannic chloride as catalyst. The exact amount of solvent is generally not critical. However, with a weight ratio of solvent to monomer of less than 0.5, i.e., 1 part of solvent per 2 parts of monomer, it is difficult to obtain the desired degree of polymerization without gelation. Usually a solvent/monomer ratio of from about 1 to 5 is preferred. With a solvent/monomer ratio greater than about 10, a higher catalyst concentration may be needed to achieve a suitable rate of polymerization.

To carry out the polymerization the reaction mixture containing monomer, catalyst, and diluent is heated with agitation at a temperature in the range from 0° to 85° C. for a time sufficient to achieve the desired polymerization. While the rate of reaction is dependent on such other factors as concentration of monomer or catalyst, the reaction rate at a temperature below about 0° C. is generally too slow for practical purposes. At temperatures higher than 85° C., it is difficult to prevent substantial cross-linking even with considerable solvent dilution. In practice, it is generally desirable to operate at a temperature in the range from 20 to 85° C. and preferably in the range from about 40° C. to 70° C.

To achieve the desired degree of polymerization, a reaction time of from 0.25 to 20 or more hours may be required. The extent of reaction can be determined by observing the viscosity of the reaction mixture, by analysis of product samples for halide, or by other conventional means. The viscosity of the product is a particularly important control factor. Normally a gradual increase in solution viscosity is observed as polymerization proceeds. Then a sharp increase in viscosity of the solution usually occurs just prior to gelation of the product. To avoid formation of any substantial amount of insoluble cross-linked polymer, the reaction is quenched prior to, or when this sharp increase in viscosity is observed by addition of sufficient water, alcohol or other material to inactivate the catalyst.

Usually the polymerization is carried out at atmospheric pressure with appropriate provisions for venting or disposing of the by-product hydrogen halide. At times a moderate reduced pressure may be desirable to achieve a more rapid removal of the hydrogen halide. Alternately to maintain a liquid phase with a low boiling solvent, a moderate pressure can be used.

It will be understood that various changes in the detailed polymerization process may be made by those skilled in the art within the scope of the invention disclosed herein. Optimum reaction conditions for a given system can be determined by routine tests.

In summary, by the condensation polymerization of a reactive aromatic material comprising in the major proportion a suitable diphenyl ether derivative in the presence of a non-reactive diluent and a Friedel-Crafts catalyst at a temperature in the range from 0° to 85° C., soluble diphenyl ether polymers are obtained. These new soluble diphenyl ether polymers comprise in major proportion a plurality of diphenyl ether moieties linked with methylene bridges. Because of the thermal stability of the diphenyl ether moiety, polymers with few residual substituent groups are useful as thickeners for oils. But more important these soluble polymers are generally valuable as intermediates for further synthesis and particularly for the synthesis of soluble cationic derivatives as described below. Even the polymers with an average of only 0.05 residual halomethyl groups are useful in the synthesis of low capacity cationic products. Alternately polymers with reactive, unsubstituted aromatic sites may be further treated as, for example, by chloromethylation, to provide products with additional reactive substituents.

SOLUBLE CATIONIC DIPHENYL ETHER POLYMERS

In addition to the soluble diphenyl ether polymers and the process for their synthesis described above, it has been further discovered that cationic groups (Z) can be chemically bonded to the soluble diphenyl ether matrix by reaction of the residual halomethyl groups attached to the polymer with suitable reagents such as organic amines or sulfides. The cationic groups are thus bonded to the polymer as substituents of the general formula:

$$-CH_2Z$$

Introduction of an average of more than about 0.3 hydrophilic cationic groups per diphenyl ether moiety usually gives a water-soluble product particularly when the cationic group is a quaternary ammonium or a sulfonium group prepared with a low molecular weight, water-soluble amine or sulfide. With less than an average of about 0.3 hydrophilic cationic groups per diphenyl ether moiety, the product usually gives a hazy or opaque mixture with water. Some of these lightly substituted cationic derivatives are soluble in alcohol, but with an average of less than about 0.1 cationic group per diphenyl ether moiety, the products are soluble only in non-polar organic solvents.

By appropriate choice of the reactants and particularly of the halomethyl content of the diphenyl ether polymer, it is possible to obtain new and useful soluble cationic products with a wide range of solubility and functional capacity. The water-soluble cationic diphenyl ether polymers are effective as flocculants in aqueous systems, while the water-insoluble cationic derivatives are useful as extractants to remove anions from aqueous process streams.

Particularly desirable are soluble, strongly basic quaternary ammonium derivatives obtained by the reaction of a soluble diphenyl ether polymer with a tertiary amine. For a water-soluble product the intermediate polymer should have at least 0.3 residual halomethyl group per diphenyl ether moiety and for a high capacity product it is advantageous to employ an intermediate polymer with a high residual halomethyl content such as the product from homopolymerizing a chloromethylated diphenyl ether containing 30 or more weight percent chlorine.

The desired quaternary ammonium derivatives are readily prepared in high yields under mild conditions using tertiary amines of the general formula:

wherein the R groups are hydrocarbon moieties free of substituents other than hydroxyl groups. The hydrocarbon moieties can be individually aliphatic, aromatic, or acyclic groups, or taken together to form part of a 5 or 6 membered heterocyclic ring containing the tertiary nitrogen.

Amination can also be achieved with ammonia and with primary and secondary amines including alkylene polyamines, i.e., with amines of the above formula wherein at least one of the R groups is hydrogen, to give other valuable, soluble cationic derivatives.

More specifically, new and useful cationic derivatives of a soluble diphenyl ether polymer having residual halomethyl groups can be obtained with:

(1) Amines of the general formula:

$$NR_1R_2R_3$$

wherein $R_1$, $R_2$ and $R_3$ individually are selected from the group consisting of hydrogen; $C_1$-$C_{15}$ alkyl, cycloalkyl, aryl, and aralkyl hydrocarbon groups; and $C_1$-$C_4$ monohydroxyalkyl and $C_2$-$C_4$ dihydroxyalkyl groups, subject to the limitation that the amine contain not more than one aromatic moiety;

(2) Alkylene polyamines of the general formula:

$$NH_2(C_aH_{2a}NH)_bH$$

wherein $a$ is an integer from 2 to 6 inclusive and $b$ is an an integer from 1 to 4;

(3) Monocyclic amines consisting of a 5 or 6 membered ring containing from 1 to 2 heterocyclic nitrogen atoms therein and $C_1$-$C_4$ alkyl derivatives thereof; and (4) Heterocyclic polyamines of the group consisting of hexamethylenetetramine and $C_1$-$C_4$ trialkylcyclotrimethylenetriamines.

Typical of the tertiary amines which are particularly desirable in the preparation of valuable cationic derivatives are trimethylamine, tri-n-butylamine, dimethylaminoethanol, dimethylisopropanolamine, dimethylbenzylamine, dimethylaniline, dimethylcyclohexylamine, N, N-dimethylamino - 1,2 - propanediol, methyldiethanolamine, dimethylethanolamine, and dimethyldodecylamine, as well as such tertiary hetrocyclic amines as pyridine, 2,4-butadiene, N-methylmorpholine, pyrrole, N-ethylpiperidine, hexamethylenetetramine, and trialkyltrimethylenetriamines obtained by the condensation of formaldehyde and a $C_1$-$C_4$ primary aliphatic amine. Representative of the variety of primary and secondary amines which can be used are methylamine, diisopropylamine, methylethanolamine, N-methylaniline, piperidine, 2,5-dimethylpiperazine, 2-aminoethanol, isopropanolamine, and such alkylene polyamines as ethylenediamine, propylenediamine, 1,6-diaminohexane, diethylenetriamine, etc.

In practice, it is often convenient to use an aqueous solution of the desired amine. Also mixtures of two or more amines can be used. With polybasic amines, and particularly with an alkylene polyamine care must be used to prevent excessive cross-linking. But by using an appreciable excess of alkylene polyamine valuable soluble derivatives have been prepared.

Amination of the intermediate soluble halomethyldiphenyl ether polymer generally proceeds readily at a temperature between about 0° and 60° C. Often a temperature between about 20° and 45° C. is preferred. Although amination can be achieved in the absence of a solvent by careful mixing of the intermediate polymer and an anhydrous amine, it is preferably carried out in the presence of a liquid solvent in which both the amine and intermediate polymer are soluble such as toluene, methylene chloride, or ethylene dichloride. Often the solvent employed as diluent in the polymerization can be used in the amination thus eliminating the necessity for isolating the intermediate polymer. In many cases it is both effective and convenient to add to the polymerization mixture after the desired degree of polymerization has been achieved an aqueous solution containing an excess of the desired amine. A 10 to 25 percent excess of amine based on residual halomethyl content of the intermediate polymer is often sufficient. Then the mixture is stirred at the desired temperature until the animation is complete. A reaction time ranging from a few minutes to several hours is usually adequate although a longer time may be required for less active amines.

When an aqueous solution of amine is employed, the cationic amination product is usually obtained in the aqueous phase. For many purposes it can be satisfactorily used without isolation from solution. However, if necessary, the product can be isolated by evaporation of the solvent or other conventional means.

Still other cationic derivative can be prepared by reacting the soluble intermediate halomethyldiphenyl ether polymer with an organic sulfide. Particularly desirable are the sulfonium derivatives prepared from sulfides of the general formula:

$$SR_4R_5$$

wherein $R_4$ and $R_5$ individually are members of the class consisting of: (1) $C_1-C_6$ alkyl groups, (2) $C_2-C_4$ monohydroxyalkyl groups, (3) $C_1-C_6$ haloalkyl groups, (4) $C_7-C_{12}$ aralkyl groups, and (5) $-C_mH_{2m}COOQ$ wherein $m$ is an integer from 1 to 4 and Q is selected from the group consisting of hydrogen, alkali metal cations, and $C_1-C_6$ alkyl groups. Typical organic sulfides which may be employed are dimethylsulfide, n-butylmethylsulfide, 2-(methylmercapto)ethanol, bis - (2 - hydroxyethyl)sulfide, and methyl 3-methylthiopropionate. Generally, it is preferable to use an organic sulfide wherein one of the substituent groups contains not more than 2 carbon atoms.

Although the reaction of the intermediate halomethyldiphenyl ether polymer with an organic sulfide is not as rapid as amination, it can be carried out under similar conditions using a suitable diluent and a reaction temperature between 20° and 60° C. A reaction time of from 2 to 20 hours or more is often required for complete reaction. With a low boiling solvent or reactant, it may be necessary to use a moderate elevated pressure.

Still another type of cationic derivative is obtained by the reaction of the soluble intermediate halomethyldiphenyl ether polymer with a tert.-dialkylaminophosphine in the general manner described by McMaster and Tolkmith in United States Patent 2,764,560, to give a quaternary phosphonium derivative. Furthermore, it is evident that by proper choice of reagents, mole ratios, and reaction conditions, it is possible to prepare products containing more than one type of cationic group such as a polymer having both quaternary ammonium and sulfonium groups.

The above cationic derivatives as prepared from an intermediate halomethyldiphenyl ether polymer have normally a halide counteranion, i.e., a chloride or bromide. However, if desired, such a halide form can be converted in conventional manner by standard ion exchange techniques to other forms with such common anions as sulfate, bisulfate, nitrate, carbonate, acetate, citrate, etc.

In summary, it has been discovered that novel and valuable cationic derivatives can be prepared from an intermediate soluble diphenyl ether condensation polymer, preferably by the reaction of residual halomethyl groups on the diphenyl ether moieties of the polymer with an appropriate amine, sulfide, aminophosphine or mixtures thereof. Because of the many possible variations in the structure of the cationic groups, soluble products can be prepared having a wide range of useful properties. The utility of these novel materials is further enhanced by the chemical and physical stability of the polymeric diphenyl ether matrix.

In order that those skilled in the art may more fully understand the invention described herein, the following examples are presented by way of illustration without limitation of the invention thereto. Unless otherwise stated all parts and percentages are by weight.

*Example 1.—Solution polymerization*

To a stirred solution of 20,370 parts of chloromethylated diphenyl ether containing 34.1 wt. percent chlorine in 19,500 parts of 1,2-dichloroethane was added 25.9 parts of anhydrous stannic chloride. The mixture was then heated at about 68° C. and its viscosity observed as a measure of the extent of polymerization. After 7.25 hrs. when the viscosity indicated that the gel point was near, 24,000 parts of water were added with thorough mixing to quench the reaction. The mixture was cooled to room temperature and the organic phase was separated. This solution of soluble diphenyl ether polymer in 1,2-dichloroethane was washed several more times with water and was then ready for further processing if desired.

A sample of the soluble polymer was isolated from the 1,2-dichloroethane solution by precipitaiton with excess methanol. The light tan solid was purified by dissolving in dioxane and reprecipitating with methanol to give an essentially white product containing by analysis 26.9 wt. percent side chain chlorine. A sample of the isolated polymer as a 10% solution in 1,2-dichloroethane had an Ostwald viscosity of 2.52 cps. at 25° C. The initial chloromethylated diphenyl ether had a viscosity under similar conditions of 1.17 cps.

*Example 2*

To a mixture of 3.0 parts of 4,4'-bis(chloromethyl) diphenyl ether and 27.0 parts of methylene chloride at room temperature was added 0.47 part of anhydrous $AlCl_3$. On shaking, the mixture immediately became a deep purple-rose in color and bubbles of HCl were evolved. After about 50 minutes another 27 parts of methylene chloride were added and the slightly cloudy mixture allowed to stand at room temperature for a total of 21.5 hrs. Then the solution was washed thoroughly with water, the organic phase recovered, and the solvent removed by evaporation at reduced pressure. There was recovered 1.08 parts of slightly pink, amorphous polymer which was subsequently converted to a soluble cationic derivative.

*Example 3.—Polymerization conditions*

Using the general procedure described in Example 1, a variety of liquid diluents and polymerization catalysts were examined in the polymerization of chloromethyldiphenyl ether. As indicated by evolution of HCl, an increase in solution viscosity, and formation of a solid product having a lower chlorine content, polymerization occurred in the presence of many diluents and a variety of Friedel-Crafts catalysts. However, when toluene and o-xylene were used as diluents, the large decrease in residual chlorine content indicated that the solvent had reacted with the monomer and/or polymer. When acetone, dioxane, or a diethylene glycol ether were used as diluents, there was no discernible polymerization.

Data from a number of typical runs using diluents which were substantially inert under normal reaction conditions are given in Tables 2 and 3.

TABLE 2.—POLYMERIZATION DILUENTS ($SnCl^4$ CATALYST)

| Run | Diluent | Diluent Ratio [1] | Catalyst Conc., percent [2] | Conditions | | Wt. percent Cl | | Viscosity, cps.[3] |
| --- | --- | --- | --- | --- | --- | --- | --- | --- |
| | | | | T. ° C. | Time, Hr. | Monomer, percent | Polymer, percent | |
| 3A-1 | 1,2-Dichloroethane | 1.0 | 0.2 | 64 | 0.6 | 31.5 | 22.1 | 6.33 |
| 3A-2 | Carbon Tetrachloride | 1.0 | 0.6 | 74 | 1.7 | 31.5 | 22.5 | 4.03 |
| 3A-3 | Methylene Chloride | 1.0 | 0.2 | 20 | 1.1 | 31.5 | 22.4 | |
| 3A-4 | Heptane | 0.6 | 0.2 | 75 | 2.0 | 31.5 | 24.5 | 2.42 |
| 3A-5 | Isooctane | 0.8 | 0.2 | 68 | 1.5 | 33.1 | 23.0 | 1.96 |
| 3A-6 | o-Dichlorobenzene | 1.3 | 0.5 | 60 | 2.7 | 34.8 | 24.8 | 2.15 |

[1] Wt. ratio of diluent/CMDPE.
[2] Wt. percent on CMDPE.
[3] 10% in 1,2-dichloroethane at 25°.

TABLE 3.—POLYMERIZATION CATALYSTS

| Run | Catalyst | Catalyst Conc., percent | Diluent [1] | Conditions | | Wt. percent Cl | | Viscosity, cps. |
| --- | --- | --- | --- | --- | --- | --- | --- | --- |
| | | | | T. °C. | Time, Hr. | Monomer, percent | Polymer, percent | |
| B-1 | SnCl₄ | 0.2 | 1,2-Dichloroethane | 64 | 0.6 | 31.5 | 22.1 | 6.33 |
| B-2 | ZnCl₂ [2] | 0.7 | do | 83 | 1.25 | 30.2 | 21.3 | 8.02 |
| B-3 | SnCl₂·2H₂O [2] | 1.3 | do | 80–87 | 6 | 30.2 | 19.5 | 1.88 |
| B-4 | H₂SO₄ | 7.0 | do | 30–50 | 16 | 31.6 | 19.5 | 1.30 |
| B-5 | AlCl₃ [3] | 3.0 | Carbon Tetrachloride | 74 | 32 | 31.6 | 24.8 | 1.44 |

[1] Diluent ratio: 0.7 to 1.5.
[2] Added as 50% solution in methanol.
[3] Only partially dissolved.

*Example 4.—CMDPE monomers*

The general polymerization procedure described in Example 1 has been used with a variety of chloromethyldiphenyl ethers including crude chloromethylation ethers including crude chloromethylation products such as shown in Table 1 as well as purified compounds. Data from a number of typical runs are given in Table 4.

viscosity of 1.87 cps. as a 10% solution in 1,2-dichloroethane. To the reactor with stirring was added 195 parts of water containing 2.5 parts of sodium hydroxide and then 386 parts of a 25% aqueous trimethylamine (1.6 moles). The reaction temperature increased to 45° C. as amination proceeded. Then the temperature was held at about 45° C. for another 2 hours to insure complete re- TABLE 4.—CMDPE MONOMERS
[1,2-dichloroethane, 0.2% SnCl₄]

| Run | Monomer | | Diluent Ratio | Conditions | | Polymer | |
| --- | --- | --- | --- | --- | --- | --- | --- |
| | Wt. percent Cl | ClCH₂/DPE | | T. °C. | Time, Hrs. | Wt. percent Cl | Viscosity |
| 4-1 | 17.4 | 1.07 | 1.0 | 20–65 | 2.1 | <2 | 8.62 |
| 4-2 | 22.1 | 1.51 | 2.0 | 40 | 1.9 | 8.8 | 14.55 |
| 4-3 | ¹26.6 | 2.00 | 6.5 | 35–50 | 1.3 | 9.4 | |
| 4-4 | 31.5 | 2.67 | 1.0 | 64 | 0.6 | 22.1 | 6.33 |
| 4-5 | 34.8 | 3.18 | 1.3 | 5–10 | 5.5 | 23.3 | 2.22 |

¹ Pure 4,4′-bis(chloromethyl)diphenyl ether.

*Example 5.—Solution polymerization of hydroxymethyl-diphenyl ether*

To a solution prepared by dissolving 95 parts of 4,4′-bis(hydroxymethyl)diphenyl ether in 250 parts of 1,2-dichloroethane at 50° C. was added 6.7 parts of anhydrous SnCl₄ dissolved in 125 parts of 1,2-dichloroethane. The reaction mixture became light brown in color as heating at 50–60° C. was continued. Polymerization was evident through a marked increase in solution viscosity. By quenching the polymerization with water prior to gelation, a soluble diphenyl ether polymer containing residual hydroxymethyl groups is obtained.

*Example 6.—Trimethyl ammonium derivative*

Into a glass reactor was placed 200 parts of a 1,2-dichloroethane solution containing 134.5 parts of a soluble chloromethyldiphenyl ether polymer having 21.8% residual side chain chlorine (0.83 mole —CH₂Cl) and a action before concentrating the clear colorless solution in vacuo to remove excess trimethylamine and the 1,2-dichloroethane. Finally the pH of the viscous residual aqueous product solution was adjusted to 7±1. Based on analysis of the chloride ion, amination was essentially quantitative. The Brookfield viscosity of a 20% aqueous solution of the methylenetrimethyl ammonium derivative of the diphenyl ether polymer was 17 cps. at 75° F. and a pH of 7.0.

*Example 7.—Other ammonium derivatives*

To illustrate the broad range of ammonium derivatives which can be prepared from the intermediate, soluble chloromethyldiphenyl ether polymer, a number of typical aminations are summarized in Table 5. In most cases the two phase, water-1,2-dichloroethane solvent system is satisfactory. However, with less water-soluble amines 1,2-dichloroethane alone or mixed with aqueous alcohol may be preferred.

TABLE 5.—OTHER AMMONIUM DERIVATIVES

| Run | Polymer, Wt. percent Cl | Amine | Mole Ratio Amine/—CH₂Cl | Reaction | | Product |
| --- | --- | --- | --- | --- | --- | --- |
| | | | | T. °C. | Time, Hrs. | |
| 7-1 | 21.8 | Tri-n-propylamine | 1.5 | 50 | 3 | Water-soluble. |
| 7-2 | 23.3 | Tri-n-butylamine | 1.5 | 45 | 16 | Do. |
| 7-3 | 21.8 | Dimethylaminoethanol | 1.5 | 50 | 0.5 | Do. |
| 7-4 | 23.3 | 2-Aminoethanol | 1.5 | 25–30 | 2 | Do. |
| 7-5 | 21.0 | Pyridine | 1.45 | 42 | 6 | Do. |
| 7-6 | 23.3 | N,N-Dimethylaniline | 2.2 | 54 | 1 | Alcohol-soluble.¹ |
| 7-7 | 21.0 | Dimethyldodecylamine | 1.2 | 25–45 | 5 | Water-soluble. |
| 7-8 | 21.3 | {Hexamethylenetetramine / Trimethylamine} | {0.5 / 0.7} | 40 | 1 | Do. |
| 7-9 | ~25 | {Trimethylamine / Dimethylamine} | {0.8 / 0.45} | 40–70 | 0.67 | Do. |

¹ Soluble in methanol, isopropanol, and 50% aqueous isopropanol.

Example 8.—Alkylene polyamine derivatives

To a solution of 5 parts of precipitated chloromethyldiphenyl ether polymer in 10 parts of 1,4-dioxane was rapidly added 40 parts of anhydrous ethylenediamine. The mixture became light yellow in color with a noticeable heat of reaction. After 2 hours at room temperature the clear solution was diluted with 150 parts of water. The product was completely soluble. Amination as shown by chloride analysis was complete.

In a similar manner, a soluble derivative was also prepared by using a large excess of diethylenetriamine. These water-soluble alkylene polyamine derivatives are effective flocculants.

Example 9.—Sulfonium derivatives (A) The polymer solution described in Example 1 was diluted with about 28,000 parts of 1,2-dichloroethane and dried by azeotropic distillation. The resulting clear solution was mixed with 8,000 parts of diethylene glycol ethyl ether and heated to about 50° C. Then 16,610 parts of thiodiglycol were added slowly to the stirred mixture over a period of 1–2 hours while maintaining a one-phase system. After heating for another several hours at 50–55° C., 12,500 parts of water were gradually added again maintaining a single phase system. Finally another 12,500 parts of water were rapidly added and the 1,2-dichloroethane stripped in vacuo to give a clear viscous solution of the bis(2-hydroxyethyl)sulfonium derivative in aqueous glycol ether. Because the sulfonium derivative decomposes slowly in the absence of solvent, it is preferably stored and used as an aqueous solution.

(B) To 162 parts of a 1,2-dichloroethane solution containing 55.5 parts of a soluble chloromethyldiphenyl ether polymer having about 23% residual side chain chlorine (0.36 mole —CH$_2$Cl) was added 150 parts of water and 31.8 parts (0.51 mole) of dimethylsulfide. The mixture was heated at 50–55° C. for 6 hours and then cooled. The cloudy mixture slowly separated into 2 clear viscous layers. Addition of another 40 parts of water gave a clear viscous, light yellow solution of the dimethyl sulfonium derivative. By analysis for ionic chloride, reaction of the residual chloromethyl groups was shown to be essentially complete.

Example 10.—Mixed cationic derivatives (A) Using the procedure described in Example 1, 480 parts of a chloromethyldiphenyl ether containing 33.5 wt. percent Cl were polymerized in 1,2-dichloroethane to give a soluble polymer containing 24.5 wt. percent residual chlorine (3.10 moles —CH$_2$Cl). The solution was concentrated to remove residual water and then 205 parts (1.55 moles) of thiodiglycol were added. The resulting mixture was heated at 50° C. for one hour, diluted with 158 parts of isopropanol and heated for another 3 hours at about 50° C. Then 480 parts of 25% aqueous trimethylamine (2.00 moles) and 800 parts of water containing 0.5 part of sodium hydroxide were added to aminate the residual chloromethyl groups. After mixing another 2 hours at 45°–50° C., the excess reactants and the bulk of the solvent were removed giving a slightly cloudy, very viscous, mixed cationic product which dissolved readily in water.

(B) To 142 parts of a 50% aqueous solution of a chloromethyldiphenyl ether polymer containing 21.8% residual chlorine (0.44 mole —CH$_2$Cl) at 50° C. were added 28.8 parts (0.24 mole) of thiodiglycol followed by 14.7 parts (0.10 mole) of hexamethylenetetramine and finally another 28.9 parts (0.24 mole) of thiodiglycol. The resulting exothermic reaction raised the temperature to 67° C. and gave a mixture which was initially clear. But as the reaction continued at 50–55° C. for several hours, the mixture became creamy. Finally 100 parts of water containing 0.5 part of sodium hydroxide were added and the 1,2-dichloroethane was removed by distillation. The residual aqueous product mixture was cloudy. But after standing at room temperature for about 24 hours, it became clear, the final mixed cationic product being completely water-soluble.

Example 11.—Flocculant activity

The water-soluble cationic diphenyl ether polymers of the types illustrated in Examples 6–10 have been found to be effective flocculants in preliminary tests with a variety of aqueous slurries. Since flocculant activity is dependent on both the nature of the polymer and the suspended solids, different activities will be found even with a common polymer matrix.

Representative data from several preliminary screening tests are given in Table 6. These tests involved addition of a few drops of dilute aqueous polymer solution to a standard aqueous test slurry. With the 10% slurry of Minco bond clay and 13% slurry of Erie Taconite tailings, the settling characteristics of the treated slurry were observed. In the test with the 5% digested sludge, the ease of removing water on a vacuum filter was examined.

TABLE 6.—FLOCCULANT SCREENING

| Cationic Polymer | | Positive Flocculant Activity With— |
|---|---|---|
| Run | Reactant | |
| 6 | Trimethylamine | Digested Sludge; Erie Taconite. |
| 9A | Thiodiglycol | Digested Sludge. |
| 7-1 | Tri-n-propylamine | Minco Bond Clay. |
| 7-2 | Tri-n-butylamine | Do. |
| 7-5 | Pyridine | Do. |
| 7-6 | N,N-Dimethylaniline | Do. |
| 7-8 | Hexamethylenetetramine plus Trimethylamine | Do. |
| 10 | Hexamethylenetetramine plus Thiodiglycol | Do. |

We claim:
1. A soluble methylenediphenyl ether polymer prepared by the condensation polymerization of a reactive aromatic material which:
   (a) consists in major proportion by weight of a diphenyl ether of the formula:

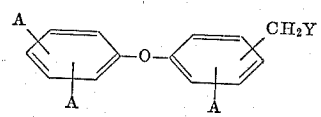

wherein each A independently is H or —CH$_2$Y and Y is Cl, Br, OH or OR where R is a C$_1$–C$_4$ alkyl group, and
   (b) contains an average of about 1.5 to 3.5 —CH$_2$Y groups per reactive aromatic molecule;
said polymerization being achieved in the presence of:
   (c) an inert diluent selected from a group consisting of aliphatic hydrocarbons, halogenated aliphatic hydrocarbons and halogenated aromatic hydrocarbons having a boiling point between 30° and 150° C., and (d) a Friedel-Crafts catalyst at a temperature of about 0° to 85° C. to yield a polymer which consists essentially in a plurality of methylenediphenyl ether groups of the formula:

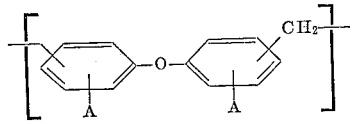

wherein A is H or —CH$_2$Y as defined above.

2. The soluble methylenediphenyl ether polymer of claim 1 wherein Y is Cl.

3. The soluble methylenediphenyl ether polymer of claim 2 wherein the inert diluent is a halogenated aliphatic hydrocarbon.

4. The soluble methylenediphenyl ether polymer of claim 2 wherein the catalyst is stannic chloride.

5. The soluble methylenediphenyl ether polymer of claim 2 wherein the catalyst is zinc chloride.

6. The soluble methylenediphenyl ether polymer of claim 2 wherein the polymer contains up to about 30.0 weight percent side chain chlorine.

7. The soluble methylenediphenyl ether polymer of claim 2 wherein the polymer has an Ostwald viscosity of about 1.3 to 25 centipoises as a 10 weight percent solution in 1,2-dichloroethane at 25° C.

8. The soluble methylenediphenyl ether polymer of claim 2 wherein the polymer contains an average of at least 0.3 chloromethyl groups per methylenediphenyl ether group.

9. A process for preparing a soluble methylenediphenyl ether polymer by condensation polymerization of a reactive aromatic material which:

(a) consists in major proportion by weight of a diphenyl ether of the formula:

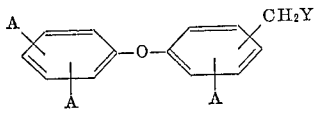

wherein each A independently is H or —CH$_2$Y and Y is Cl, Br, OH or OR where R is a C$_1$–C$_4$ alkyl group, and (b) contains an average of about 1.0 to 3.5 —CH$_2$Y groups per reactive molecule, in the presence of:

(c) an inert diluent selected from a group consisting of aliphatic hydrocarbons, halogenated aliphatic hydrocarbons and halogenated aromatic hydrocarbons having a boiling point between 30° and 150° C., and (d) a Friedel-Crafts catalyst at a temperature of about 0° to 85° C.

10. The process of claim 9 wherein the reactive aromatic material is a chloromethyldiphenyl ether.

11. The process of claim 10 wherein the inert diluent is a halogenated aliphatic hydrocarbon.

12. The process of claim 10 wherein the catalyst is stannic chloride.

13. The process of claim 10 wherein the catalyst is zinc chloride.

14. The process of claim 9 wherein a soluble methylenediphenyl ether homopolymer is prepared by reacting a mixture of 10 parts of a chloromethyldiphenyl ether containing an average of about 1.0 to 3.5 chloromethyl groups per molecule of diphenyl ether, from 10 to 90 parts of a halogenated aliphatic hydrocarbon, and from 0.01 to 0.1 part of anhydrous stannic chloride at a temperature between 0° and 85° C. for a time sufficient to obtain a soluble methylenediphenyl ether homopolymer.

15. A soluble cationic methylenediphenyl ether polymer consisting essentially of a plurality of methylenediphenyl ether groups of the formula:

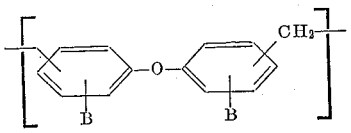

wherein B is H or —CH$_2$Z and Z is an ammonium, sulfonium or phosphonium group, and containing an average of at least 0.05 —CH$_2$Z groups per methylenediphenyl ether group, said cationic polymer being obtained by reacting a soluble methylenediphenyl ether polymer prepared by the process of claim 9 with a suitable amine, sulfide or phosphine to introduce the cationic group Z.

16. A soluble cationic methylenediphenyl ether polymer consisting essentially of a plurality of methylenediphenyl ether groups of the formula:

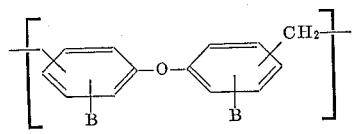

wherein B is H or —CH$_2$Z and Z is an ammonium, sulfonium or phosphonium group, and containing an average of at least 0.3 —CH$_2$Z groups per methylenediphenyl ether group, said cationic polymer being obtained by reacting the soluble methylenediphenyl ether of claim 8 with a suitable amine, sulfide or phosphine to introduce the cationic group Z.

17. The water-soluble cationic polymer of claim 16 wherein the cationic groups (Z) are quaternary ammonium groups.

18. The water-soluble cationic polymer of claim 16 wherein the cationic groups (Z) are trimethyl ammonium groups.

19. The water-soluble cationic polymer of claim 16 wherein the cationic groups (Z) are hexamethylenetetraminium groups.

20. The water-soluble cationic polymer of claim 16 wherein the cationic groups (Z) are a mixture of trimethyl ammonium and hexamethylenetetraminium groups.

21. The water-soluble cationic polymer of claim 16 wherein the cationic groups (Z) are a mixture of trimethyl ammonium and dimethyl ammonium groups.

22. The water-soluble cationic polymer of claim 16 wherein the cationic groups (Z) are bis(2-hydroxyethyl) sulfonium groups.

23. The water-soluble cationic polymer of claim 16 wherein the cationic groups (Z) are a mixture of trimethyl ammonium and bis(2-hydroxyethyl)sulfonium groups.

24. The water-soluble cationic polymer of claim 16 wherein the cationic groups (Z) are a mixture of hexamethylenetetraminium and bis(2-hydroxyethyl)sulfonium groups.

References Cited by the Examiner

UNITED STATES PATENTS

| | | | |
|---|---|---|---|
| 2,911,380 | 11/1959 | Doedens | 260—47 |
| 3,201,469 | 8/1965 | Sonnabend | 260—47 |
| 3,219,698 | 11/1965 | Halpern | 260—47 |

OTHER REFERENCES

Helfferich: Ion Exchange, p. 47, McGraw-Hill Book Co., New York (1962) Q.D.561H4 (1962).

WILLIAM H. SHORT, *Primary Examiner.*

SAMUEL H. BLECH, *Examiner.*

J. C. MARTIN, M. GOLDSTEIN, *Assistant Examiners.*